Figures 1, 2, 3:
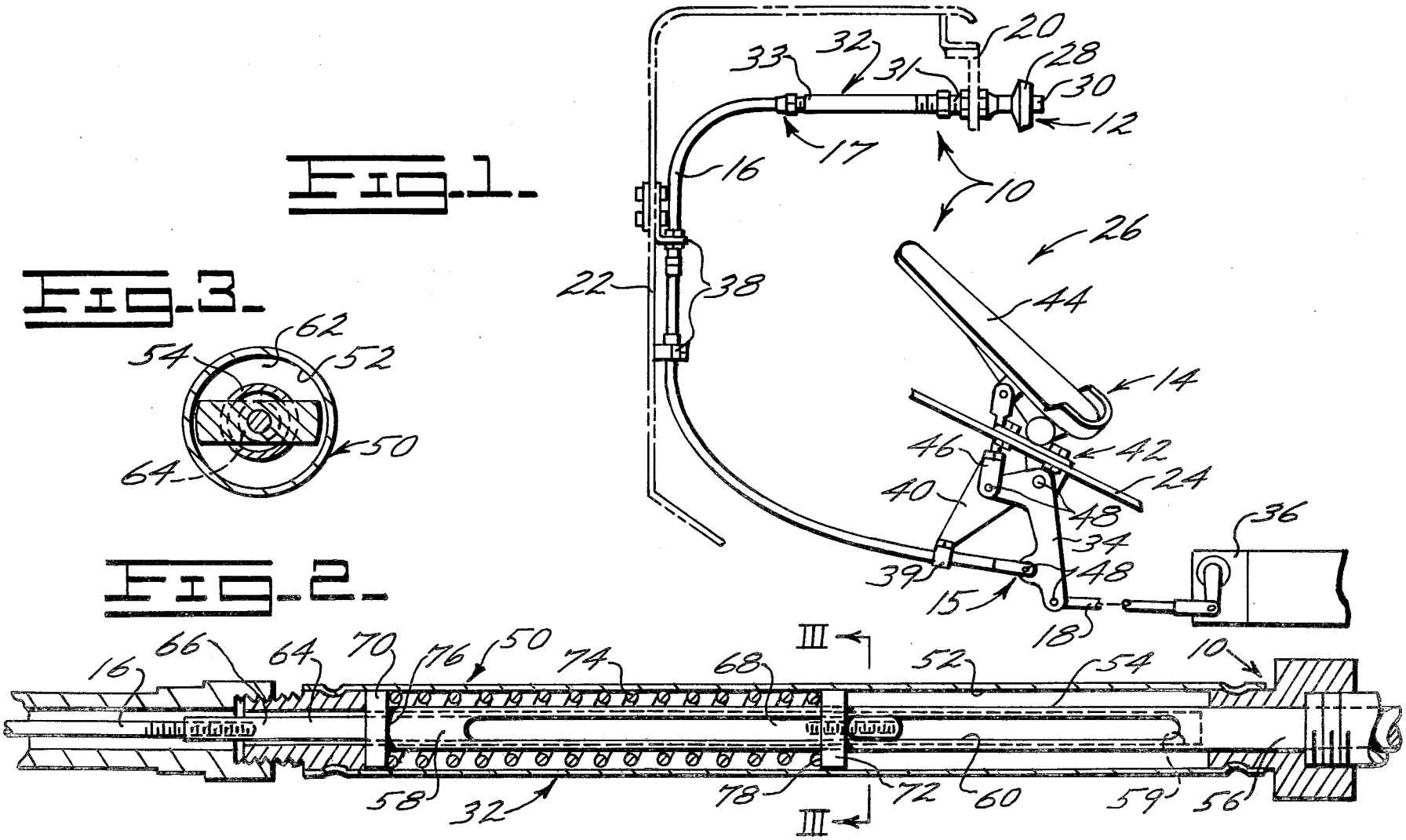

United States Defensive Publication [19] (H) [11] T984,001

Kelly [43] Jul. 3, 1979

[54] DECELERATOR MECHANISM

[75] Inventor: Orson K. Kelly, Aurora, Ill.

[73] Assignee: Caterpillar Tractor Co., Peoria, Ill.

[21] Appl. No.: 899,432

[22] Filed: Apr. 24, 1978

[51] Int. Cl.[2] ..... F16C 1/10

[52] U.S. Cl. ..... 74/501 R; 74/501.5 R; 74/512

[57] ABSTRACT

A decelerator mechanism for a vehicle has a speed control with a releasable lock and a complementing pivotal control connected by a control cable. Movement of the cable is controlled by a force biasing device. The force biasing device has first and second rods and associated stop elements co-acting with a spring for initially setting and holding a base engine operating speed, selectively reducing the base speed, in response to moving the pivotal control and automatically returning to the base speed in response to releasing the pivotal control.

1 Claim, 1 Sheet Drawing,

6 Pages Specification

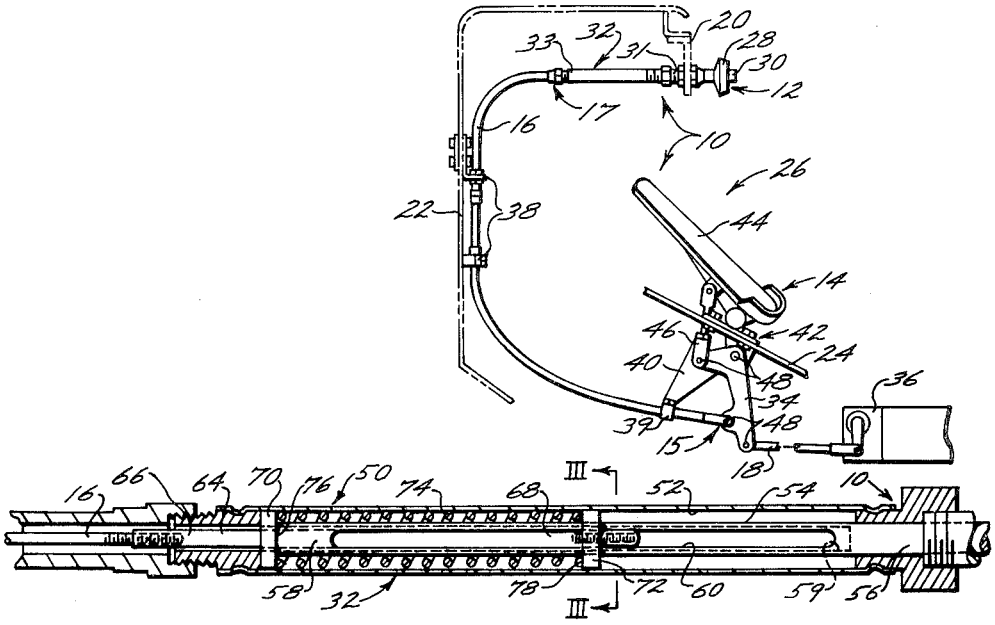

The file of this unexamined application may be inspected and copies thereof may be purchased (849 O.G. 1221, Apr. 9, 1968).